(No Model.) 3 Sheets—Sheet 1.
W. F. JENKINS.
CONDUIT FOR ELECTRIC RAILWAYS.
No. 481,403. Patented Aug. 23, 1892.
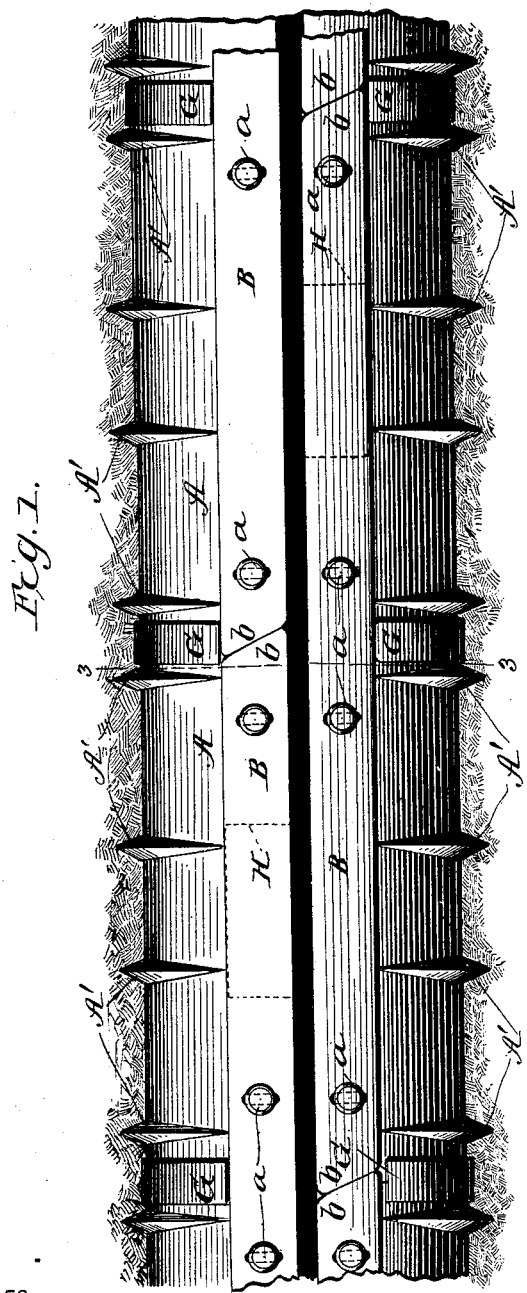
WITNESSES:
Fred G. Dieterich
Edw. W. Byrn
INVENTOR:
Wilton F. Jenkins
BY Munn & Co.
ATTORNEYS (No Model.) 3 Sheets—Sheet 2.
W. F. JENKINS.
CONDUIT FOR ELECTRIC RAILWAYS.
No. 481,403. Patented Aug. 23, 1892.
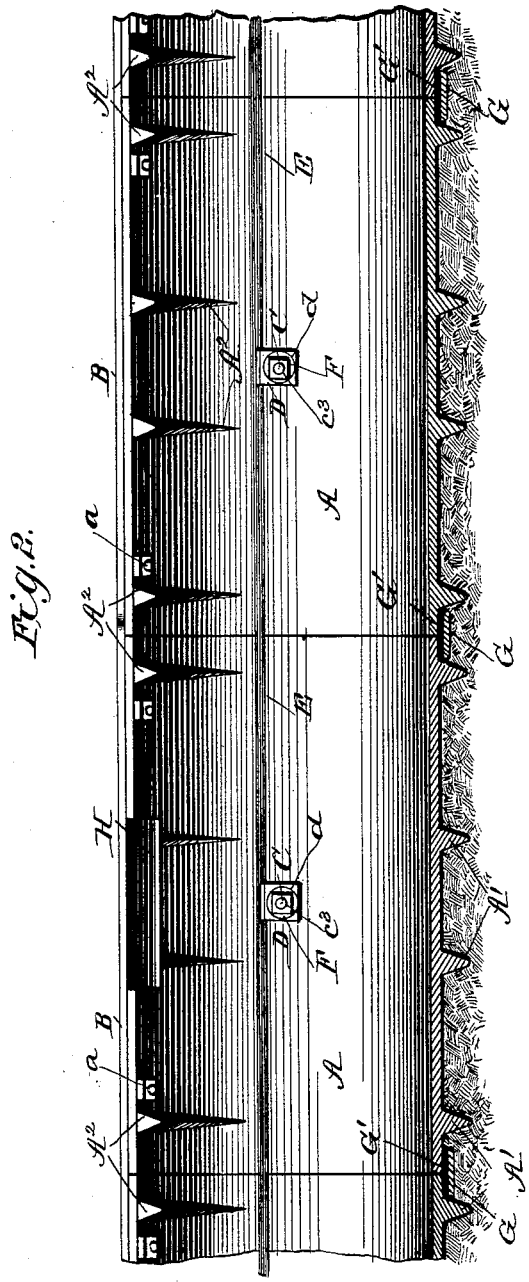
WITNESSES:
Fred G. Dieterich
Edw. W. Byrn
INVENTOR:
Milton F. Jenkins
BY Munn & Co.
ATTORNEYS (No Model.) 3 Sheets—Sheet 3.
W. F. JENKINS.
CONDUIT FOR ELECTRIC RAILWAYS.
No. 481,403. Patented Aug. 23, 1892.
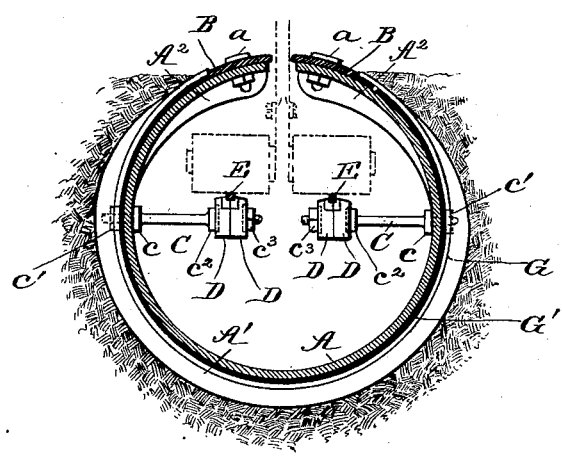
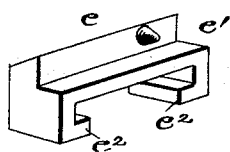
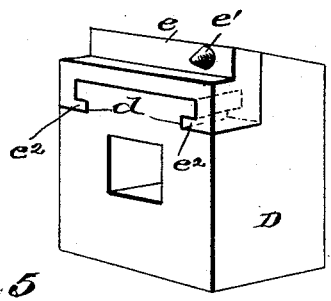
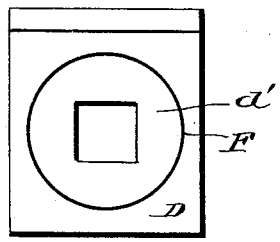
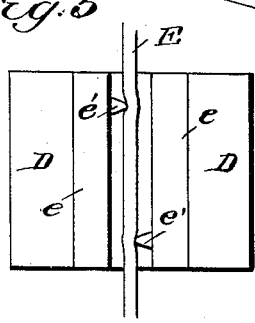
WITNESSES:
Fred G. Dieterich
Edw. W. Byrn.
INVENTOR:
Wilton F. Jenkins,
BY Munn & Co
ATTORNEYS
THE NORRIS PETERS CO., PHOTO-LITHO., WASHINGTON, D. C.

UNITED STATES PATENT OFFICE.

WILTON F. JENKINS, OF RICHMOND, VIRGINIA, ASSIGNOR OF FIVE-SIXTEENTHS TO LOUIS EUKER AND WILLIAM E. SHELLEY, OF SAME PLACE.

CONDUIT FOR ELECTRIC RAILWAYS.

SPECIFICATION forming part of Letters Patent No. 481,403, dated August 23, 1892.

Application filed September 5, 1891. Serial No. 404,812. (No model.)

*To all whom it may concern:*

Be it known that I, WILTON F. JENKINS, of Richmond, in the county of Henrico and State of Virginia, have invented certain new and useful Improvements in Electric Conduits, of which the following is a specification.

The object of my invention is to provide an underground conduit for the purpose of carrying one or more circuit wires or conductors for electric railways; and it consists in the peculiar construction of the body of the conduit and in the means for holding the electric conductors in proper insulated position, as will be hereinafter fully described.

Figure 1 is a plan view of a portion of the conduit. Fig. 2 is a vertical longitudinal central section. Fig. 3 is a vertical transverse section. Fig. 4 is a perspective view of the inside face of one of the insulating-blocks and gripping-jaws. Fig. 5 is a plan view of both blocks and jaws holding the conductor E. Fig. 6 is an outside view of one of the insulating-blocks, and Fig. 7 is an inside view in perspective of one of the gripping-jaws.

In the drawings, A represents the body of the conduit, which is made, preferably, of cast-iron in the form of a cylinder fourteen to eighteen inches in diameter and provided with a continuous longitudinal slot at its upper side. This cylinder is made as thin as practicable, and to give it greater strength it is formed upon its outer surface with transverse ribs $A'$, which do not extend to the slot on top, but gradually taper and die away on each side of the same, so as to avoid interfering with the road-bed and to give room, also, for the application of detachable slot-plates to the edges of the slot in the conduit. To reinforce the overhanging edges of the conduit against the strain of horses' hoofs or the wheels of heavily-laden vehicles, transverse short ribs $A^2$ are cast upon the inside of the conduit and extend from the edge of the slot to the point where the cylinder is reinforced by the external ribs. The conduit is constructed of cylindrical sections A, whose ends abut together and whose joints are covered by metal collars G with a metal luting or packing to make them water-tight.

B B are the slot-plates. These are each made of a length equal to two of the conduit-sections, and the joints of these plates alternate upon opposite sides of the slot, fitting together with inclined ends, as at $b\ b$. These plates also lap and splice the joints of the conduit-sections on both sides of the slot—i. e., the joint of the conduit-sections comes in the middle of the slot-plate on one side of the slot and the diagonal joint of the ends of the plates laps obliquely across the conduit-joint on the other side of the slot. These plates are secured by bolts $a$ to the edges of the conduit-slot, and being perfectly smooth and straight avoid the necessity of accurately dressing the slot-edges of the conduit-sections. As these plates bridge over the joints, they leave a perfectly-smooth surface for the guidance of the trolley-shank, which prevents the latter from catching or hanging. At suitable intervals along the conduit the sections are provided with manholes H, which are covered or closed by the slot-plates B, which thus serve a double purpose.

C are the conductor-supports. There may be one or two of these, according as there are one or two conductors. As shown, there are two, projecting diametrically from opposite sides of the conduit in horizontal position and approaching but not touching each other. As they are of similar construction and arrangement, it will be necessary only to describe one. These supports are in the nature of bolts C, having each at its outer end a collar $c$ with a screw-threaded end which projects through the wall of the conduit and is provided upon the outside with a nut $c'$, which when screwed up draws the collar $c$ tightly against the wall of the conduit and holds the bolt rigidly in horizontal position. On the inner end of this bolt is formed a collar $c^2$ and beyond this the bolt is squared, and at the end it is screw-threaded and provided with a nut $c^3$. On the square inner end of these bolts C are fitted two twin blocks D D, of hard rubber, glass, or other non-conductor of electricity. These blocks have upon their adjacent faces recesses with undercut grooves $d$ $d$, adapted to receive the detachable metal jaws $e$. These jaws have lugs $e^2$, that slip into the grooves $d$ of the blocks, and have, also, each upon its face a tooth $e'$, that together form the clutch or engaging surface that holds the conductor E. The conductor E is made of copper and preferably square in cross-section and is caught and held between the teeth $e'$ of the two jaws $e$ in the insulator-blocks, the two jaws and blocks being clamped together upon the conductor between the nut $c^3$ and collar $c^2$, the degree of pinch or firmness of the hold being regulated by the nut $c^3$. The object in making the bolt square where it passes through the insulating-blocks is to prevent the latter from turning, and for this purpose any other angular or non-circular construction may be used.

In the outer face of the blocks D are formed recesses $d'$, adapted to receive an elastic washer F. These serve to prevent the fracture of the blocks D when made of glass or other brittle material.

In constructing the jaws $e$ the tooth $e'$ of one jaw is not placed directly opposite the tooth of the other jaw, but is arranged out of coincidence. The object of this is to prevent the two teeth from biting the conductor in two, which they would be liable to do when screwed up if placed directly opposite each other. By placing them out of coincidence the conductor is simply crimped or cramped between them without being cut or weakened.

In constructing the slot-plates B they are formed with enlarged bolt-holes or transverse slots to receive the bolts that secure them to the conduits, so that the slot-plates may be adjusted laterally to vary the width of the slot, as circumstances may render desirable.

Having thus fully described my invention, what I claim is—

1. A tubular conduit formed with a longitudinal slot and provided along the length of each section with a series of transverse external reinforcing-ribs extending around the same, terminating on the external periphery some distance from the slot and reappearing internally and extending to a point immediately adjacent to the slot and supplementing the lack of the external ribs at this point, substantially as shown and described.

2. A tubular slotted conduit having a series of transverse reinforcing-ribs arranged internally near the slot and externally throughout the other portions of the conduit, in combination with slot-plates applied externally to the conduit upon each side of the slot, substantially as and for the purpose described.

3. The combination of a tubular and slotted conduit-section having a manhole opening into the slot and a slot-plate applied to the side of the conduit-slot and forming also the cover to the manhole, substantially as shown and described.

4. The combination, with the tubular and slotted conduit-sections, of removable slot-plates made longer than the conduit-section and overlapping the joints of the conduit-sections both at the middle of the slot-plates and at the ends of the slot-plates, substantially as shown and described.

5. The combination, with the tubular and slotted conduit-sections, of removable slot-plates applied to the edges of the slot and having their ends cut diagonally and fitting with an oblique joint across the joint of the conduit-section, substantially as shown and described.

6. The combination, with the tubular and slotted conduit-sections having external ribs near their ends, of a metallic collar applied between the ribs and overlapping the joint of the conduit-sections and a water-tight luting or packing retained between the collar and the ribs, substantially as shown and described.

7. The combination, with a conduit, of a conductor-support having a collar or shoulder and a screw-nut and insulated clamping-jaws arranged between them to clutch and hold the conductor, substantially as shown and described.

8. The combination, with a conductor, of insulated clamping-jaws having teeth or opposite binding-surfaces for the conductor arranged out of coincidence with each other, substantially as and for the purpose described.

9. The combination, with the bolt C, having shoulder $c^2$ and nut $c^3$ and squared or non-circular shank between, of the insulating-blocks D, with clamping-jaws having a perforation corresponding to the shank, substantially as shown and described.

10. The combination of the bolt C, having shoulder $c^2$ and screw-nut $c^3$, the insulating-blocks D D, with recessed face and grooves $d$ $d$, and the detachable jaws $e$, with lugs $e^2$ and teeth $e'$, substantially as shown and described.

WILTON F. JENKINS.

Witnesses:
EDW. W. BYRN,
P. B. TURPIN.